3,840,586
PROCESS FOR PRODUCING β-MERCAPTO-
PROPIONIC ESTER
Tetsuo Chiba, Yokohama, Yoshitoshi Itsukaichi, Kawasaki, and Masahiko Kawai and Kooichiro Murata, Tokyo, Japan, assignors to Sankyo Organic Chemicals Company Limited, Kawasaki-shi, Kanagawa-ken, Japan
No Drawing. Filed Sept. 11, 1972, Ser. No. 288,163
Int. Cl. C07c 149/20
U.S. Cl. 260—481 R    7 Claims

ABSTRACT OF THE DISCLOSURE

The reaction between an acrylic acid ester with an alkali hydrosulfide to form an ester of β-mercaptopropionic acid is carried out using carbon disulfide as a reaction medium in an amount equivalent to the $\alpha,\beta$-double bond in the acrylic acid ester.

---

This invention relates to a process for producing β-mercaptopropionic acid or β - mercaptopropionic acid ester [hereinafter these are collectively referred to as "β-mercaptopropionic acid (ester)"] by the reaction between acrylic acid or acrylic ester [hereinafter these are collectively referred to as" acrylic acid (ester)] and alkali hydrosulfide.

It has heretofore been known that β-mercaptopropionic acid (ester) may be synthesized by the reaction of β-chloropropionic acid (ester) with an alkali hydrosulfide or thiourea. The synthesis, however, involved a tedious operation and was not industrially satisfactory. It has also been known that the reaction of acrylic acid (ester) with hydrogen sulfide forms β-mercaptopropionic acid (ester). This procedure, however, brought about the formation of large quantities of thiodipropionic acid (ester) and was found inappropriate as a process for the production of β-mercaptopropionic acid (ester).

Extensive studies conducted by the present inventors to obtain the aforesaid mercaptopropionic acid (ester) at low cost and in a simple manner, have resulted in the present invention, where it has been found that β-mercaptopropionic acid (ester) can be obtained in high yield by an easy operation using carbon disulfide as a reaction medium in carrying out the reaction of acrylic acid (ester) with alkali hydrosulfide. That is, in the process of the present invention, as shown in the following reaction scheme, a solvent, for example, alcohol, is added to alkali hydrosulfide to prepare an alkali hydrosulfide solution and the alkali hydrosulfide solution is allowed to react with acrylic acid (ester) [1] and carbon disulfide. The reaction proceeds quickly to form an intermediate [2]. The resulting intermediate [2] is acidified with an acid, for example, hydrochloric, sulfuric or the like acid, whereby β-mercaptopropionic acid (ester) is formed and the carbon disulfide is regenerated. When the resulting β-mercaptopropionic acid (ester) is difficultly soluble in water, it is subjected to fractionation with addition of water until the alkali salt formed dissolves therein, but, if easily soluble in water, it is first extracted with benzene or other suitable solvent, followed by fractionation. Subsequently the carbon disulfide and solvent are distilled off. Distillation, recrystallization or the like operation give β-mercaptopropionic acid (ester) [3].

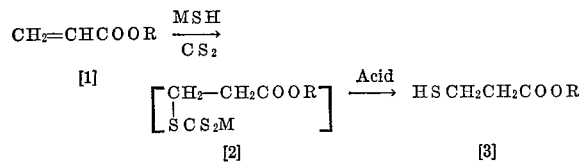

β-Mercaptopropionic acid (ester) thus obtained is useful as a starting material for the preparation of various industrial chemicals, particularly it reacts with an alkyl tin compound to give a stabilizer for resins, said stabilizer having excellent efficiency and being of highly commercial usefulness.

Acrylic acid (ester) usable as a starting material in the present invention includes those which are represented by the above-mentioned formula [1] wherein R is hydrogen, or an alkyl group of 1–24 carbon atoms, residue of polyhydric alcohol of 2–6 carbon atoms, glycol monoether or residue of polyglycol monoether, propylene glycol monoether or residue of polypropylene glycol monoether, 3-methoxybutyl group, cyclohexyl group, benzyl group, phenyl group or substituted phenyl group. Representatives of these esters include, for example, methyl acrylate, ethyl acrylate, butyl acrylate, octyl acrylate, stearyl acrylate, 3-methoxybutyl acrylate, 2-butoxyethyl acrylate, benzyl acrylate and phenyl acrylate. M of the formulas shown in the above reaction scheme represents potassium, sodium, calcium or ammonium. Carbon disulfide used as a reaction medium is fed usually to the reaction system in admixture with acrylic acid (ester), but it may also be fed without being mixed with acrylic acid (ester). In the latter case, however, the amount and feed rate of carbon disulfide are dominated by those of acrylic acid (ester) to be fed. As shown in the above reaction scheme, the amount of carbon disulfide must be equivalent to the $\alpha,\beta$-double bond in the acrylic acid (ester). The use of carbon disulfide in excess of the equivalent amount may of course be possible, but is not economically advantageous. Furthermore, there may be added another solvent, for example, benzene, toluene, xylene, methanol or the like to acrylic acid (ester) or carbon disulfide.

The alkali hydrosulfide used in the present invention, may be sodium hydrosulfide, potassium hydrosulfide, calcium hydrosulfide, ammonium hydrosulfide and the like. Usually, alkali hydrosulfide is used after being dissolved in alcohols. As examples of alcohols, there may be used methanol, ethanol, isopropanol, butanol, isoamyl alcohol, ethylene glycol, propylene glycol, hexylene glycol, glycerine and cyclohexanol. Particularly, methanol, ethanol, ethylene glycol and glycerine are preferred. Further, a solvent such as benzene, toluene, acetone or dioxane may be used in combination therewith. In order to improve the solubility of alkali hydrosulfide, water may be used in combination with alcohols. In that case, the more the amount of water is increased, the greater the amount of thiodipropionic acid (ester) formed, and hence the amount of water used should be kept as small as possible. In the case where acrylic acid is used, the amount of alkali hydrosulfide used must be two times the equivalent of acrylic acid. In the case of acrylic ester, said amount must be one equivalent of the $\alpha,\beta$-double bond in the ester. The alkali hydrosulfide may also be used in excess of that required, which, however, undesirably results in generation of large amounts of hydrogen sulfide in the subsequent acidification step. In the reaction of acrylic acid (ester)-carbon disulfide-alkali hydrosulfide, a batchwise process is usually employed wherein acrylic acid (ester) and carbon disulfide are dropped in an alkali hydrosulfide solution. However, a continuous process may also be adopted wherein acrylic acid ester, carbon disulfide, and an alkali hydrosulfide solution are fed respectively to a predetermined reaction system. In carrying out the reaction of the present invention, the reaction temperature and pressure are not particularly limited. The reaction is desirably effected at a temperature below 80° C. The reaction is an exothermic reaction and terminates quickly, and no ageing time is particularly required. It is considered that in the present reaction, carbon disulfide acts as a reaction medium. Nevertheless, it is supposed that hydro-alkali thiocarbonate is formed by the reaction of carbon disulfide with alkali hydrosulfide, and the addition to the $\alpha,\beta$-double bond of the hydro-alkali thiocarbonate forms the aforesaid intermediate of formula [2]. The intermediate is made acid to form $\beta$-mercaptopropionic acid (ester) with an acid, for example, hydrochloric or sulfuric acid. In this case, the acid used is diluted with water. Thus, $\beta$-mercaptopropionic acid (ester) is formed and carbon disulfide is regenerated. When the desired $\beta$-mercaptopropionic acid (ester) is soluble in water, it is extracted with a solvent such as benzene, and, if difficultly soluble in water, it may be fractionated without particularly adding the solvent. A crude $\beta$-mercaptopropionic acid (ester) may be purified, according to distillation or recrystallization, by isolation from by-products such as thiodipropionic ester and the like.

The process of the present invention is illustrated below with reference to examples.

EXAMPLE 1

To a solution comprising 162 g. of methanol and 84 g. of sodium hydrosulfide (obtained by dehydrating a product produced by Shikoku Kasei Kogyo K. K., Japan) was added with stirring in about 30 minutes a mixed solution of 120 g. of methyl acrylate and 114 g. of carbon disulfide. The reaction liquid was maintained at a temperature below 40° C. This was an exothermic reaction and proceeded quickly. During that time, the reaction solution assumed a yellow color and then turned to dark red. After completion of the reaction, a hydrochloric acid solution was gradually added dropwise to the reaction solution to adjust the pH of the solution to 1, whereby the solution changed in color from dark red to yellow, hydrogen sulfide gas was generated, sodium chloride was precipitated and carbon disulfide was regenerated. Subsequently, about 250 g. of water was added to the solution to completely dissolve the precipitated sodium chloride, whereby an aqueous layer and on oily layer were formed. The aqueous layer was then separated from the oily layer. The oily layer of yellow color thus obtained was heated in a nitrogen gas stream up to 80° C. to distill off methanol and carbon disulfide. Subsequently, the residual oily layer was vacuum distilled to obtain, as a fraction at 49–50° C./6 mm. Hg, 139.3 g. (82.6% yield) of a transparent colorless compound, refractive index 1.4610 (25° C.), specific gravity 1.110 (25° C.). The compound thus obtained completely coincided in boiling point as well as in retention time of gas chromatograph (4 APTF carbowax 20 M produced by Shimazu Seisakusho K. K., Japan was used) with a purified methyl $\beta$-mercaptopropionate obtained by esterification of $\beta$-mercaptopropionic acid with methanol. Thus, the compound has been confirmed to be methyl $\beta$-mercaptopropionate.

EXAMPLE 2

To a solution of 162 g. of methanol and 120 g. of sodium hydrosulfide (a product of Shikoku Kasei Kogyo K.K.: pure sodium hydrosulfide 66.69%; sodium sulfide 4.50%; water 27.0%) was added with stirring in about 30 minutes a solution of 120 g. of methyl acrylate and 114 g. of carbon disulfide. Thereafter, the same operational processes as in Example 1 were repeated to obtain a yellow oily product as a residual product. Subsequently the oily product was vacuum distilled to obtain, as a fraction at 49–50° C./6 mm. Hg, 116.2 g. (68.9% yield) of a transparent colorless compound. According to procedures similar to those in Example 1, the compound thus obtained has been confirmed to be methyl $\beta$-mercaptopropionate.

EXAMPLE 3

To a solution of 139 g. of methanol and 120 g. of sodium hydrosulfide (a product of Shikoku Kasei Kogyo K. K.: pure sodium hydrosulfide, 66.69%; sodium sulfide, 4.50%; water 27.0%) was added with stirring in about 30 minutes a mixed solution of 120 g. of methyl acrylate and 129.5 g. of carbon disulfide. In this case, the reaction liquid was maintained at a temperature below 10° C.

Thereafter, the same operational processes as in Example 1 is repeated to obtain a yellow oily product as a residual product. The oily product was then vacuum distilled to obtain, as a fraction at 49–50° C./6 mm. Hg, 126.2 g. (74.9% yield) of a transparent colorless compound. Similarly as in the case of Example 1, the compound has been confirmed to be methyl $\beta$-mercaptopropionate.

EXAMPLE 4

To a solution of 186 g. of ethylene glycol and 120 g. of sodium hydrosulfide (a product of Shikoku Kasei Kogyo K.K.: pure sodium hydrosulfide 66.69%; sodium sulfide 4.50%; water 27.0%) was added with stirring in about 20 minutes a solution of 120 g. of methyl acrylate and 114 g. of carbon disulfide. In this case, the reaction liquid was maintained at a temperature below 50° C. Thereafter, the same operational processes as in Example 1 were repeated to obtain a deep yellow oily product as a residual product, except that the reaction solution was fractionated with addition of 800 g. of water. The oily product thus obtained was vacuum distilled to obtain, as a fraction at 49–50° C./6 mm. Hg, 140.7 g. (83.5% yield) of a transparent colorless compound. The compound also has been confirmed to be methyl $\beta$-mercaptopropionate.

EXAMPLE 5

To a solution of 184 g. of glycerine and 120 g. of sodium hydrosulfide (a product of Shikoku Kasei Kogyo K.K.: pure sodium hydrosulfide 66.69%; sodium sulfide 4.50%; water 27.0%) was added with stirring in about 23 minutes a solution of 120 g. of methyl acrylate and 114 g. of carbon disulfide. In the reaction, the liquid was maintained at a temperature below 50° C. Thereafter, the reaction solution was treated in the same manner as in Example 1 except that the solution was fractionated with addition of 800 g. of water to obtain a yellow oily product as a residual product. The oily product thus obtained was vacuum distilled to obtain, as a fraction at 49–50° C./6 mm. Hg, 129.7 g. (76.9% yield) of a transparent colorless compound. The compound has also been confirmed, according to the same procedures as in Example 1, to be methyl $\beta$-mercaptopropionate.

EXAMPLE 6

In 162 g. of methanol and 10 g. of water was dissolved 99.02 g. of potassium hydroxide (pure potassium hydroxide 85%. The resulting solution was passed through hydrogen sulfide gas until the solution did not show alkalinity. To the resulting potassium hydrosulfide solution was added with stirring in about 25 minutes a mixed solution of 192 g. of butyl acrylate and 114 g. of carbon disulfide. Thereafter, the same operational processes as in Example 1 were repeated to obtain a yellow oily product as a residual product. The oily product thus obtained was vacuum distilled to obtain, as a fraction at 76.0–80.7° C./3.8 mm. Hg, 163 g. (67.0% yield) of a transparent slightly yellow compound, refractive index 1.4549 (25° C.), specific gravity 1.014 (25° C.). The compound thus obtained completely coincides in boiling point as well as in retention time of gas chromatograph with butyl $\beta$-mercaptopropionate obtained by esterification of $\beta$-mercaptopropionic acid with butanol, followed by purification. Thus, the compound has been confirmed to be butyl $\beta$-mercaptopropionate.

EXAMPLE 7

To a solution of 162 g. of methanol and 120 g. of sodium hydrosulfide (a product of Shikoku Kasei Kogyo K.K.: pure sodium hydrosulfide 66.69%; sodium sulfide 4.50%; water 27.0%) was added with stirring in about 23 minutes a solution of 276 g. of 2-ethylhexyl acrylate and 114 g. of carbon disulfide. Thereafter, the same operational processes as in Example 1 were repeated to obtain a yellow oily product as a residual product. Subsequently, the oily product was vacuum distilled to obtain, as a fraction at 120.1–126.2° C./6 mm. Hg, 204 g. (62.3% yield) of a transparent colorless compound, refractive index 1.4580 (25° C.), specific gravity 0.962 (25° C.). The compound thus obtained perfectly coincides in boiling point as well as retention time of gas chromatograph with 2-ethylhexyl β-mercaptopropionate obtained by esterification of β-mercaptopropionic acid with 2-ethylhexyl alcohol, followed by purification. Thus, the compound has been confirmed to be 2-ethylhexyl β-mercaptopropionate.

What we claim is:

1. A process for producing an ester of β-mercaptopropionic acid of the formula HS—$CH_2CH_2$—COOR in which R represents an alkyl group of 1–24 carbon atoms, 3-methoxybutyl group, cyclohexyl group, benzyl group or phenyl group, which comprises reacting an ester of acrylic acid having formula $CH_2$=CHCOOR in which R is the same as defined above with alkali hydrosulfide in carbon disulfide as a reaction medium at a temperature below 80° C., the amount of said carbon disulfide being one equivalent to the α,β-double bond in said acrylic acid ester and the amount of said alkali hydrosulfide being one equivalent to the α,β-double bond in said acrylic acid ester, and then acidifying the resulting reaction mixture.

2. The process according to Claim 1 wherein the alkali hydrosulfide is sodium hydrosulfide.

3. The process according to Claim 1 wherein the alkali hydrosulfide is potassium hydrosulfide.

4. The process according to Claim 1 wherein R is a methyl group.

5. The process according to Claim 1 wherein R is a butyl group.

6. The process according to Claim 1 wherein R is a 2-ethylhexyl group.

7. The process according to claim 1 wherein the reaction is carried out in a solvent selected from the group consisting of methanol, ethanol, ethylene glycol and glycerine.

References Cited

FOREIGN PATENTS 6508594    1/1967    Netherlands _____ 260—481 R

OTHER REFERENCES

Brewster et al.; "Organic Chemistry," 3rd ed., Prentice-Hall (1961), pp. 282–283.

LORRAINE A. WEINBERGER, Primary Examiner

J. F. TERAPANE, Assistant Examiner